W. H. BOT.
SEPARATOR.
APPLICATION FILED APR. 26, 1917.

1,287,624.

Patented Dec. 17, 1918.
3 SHEETS—SHEET 1.

Witnesses
Geo Knutson
E. C. Wells

Inventor
WILLIAM H. BOT
By his Attorneys

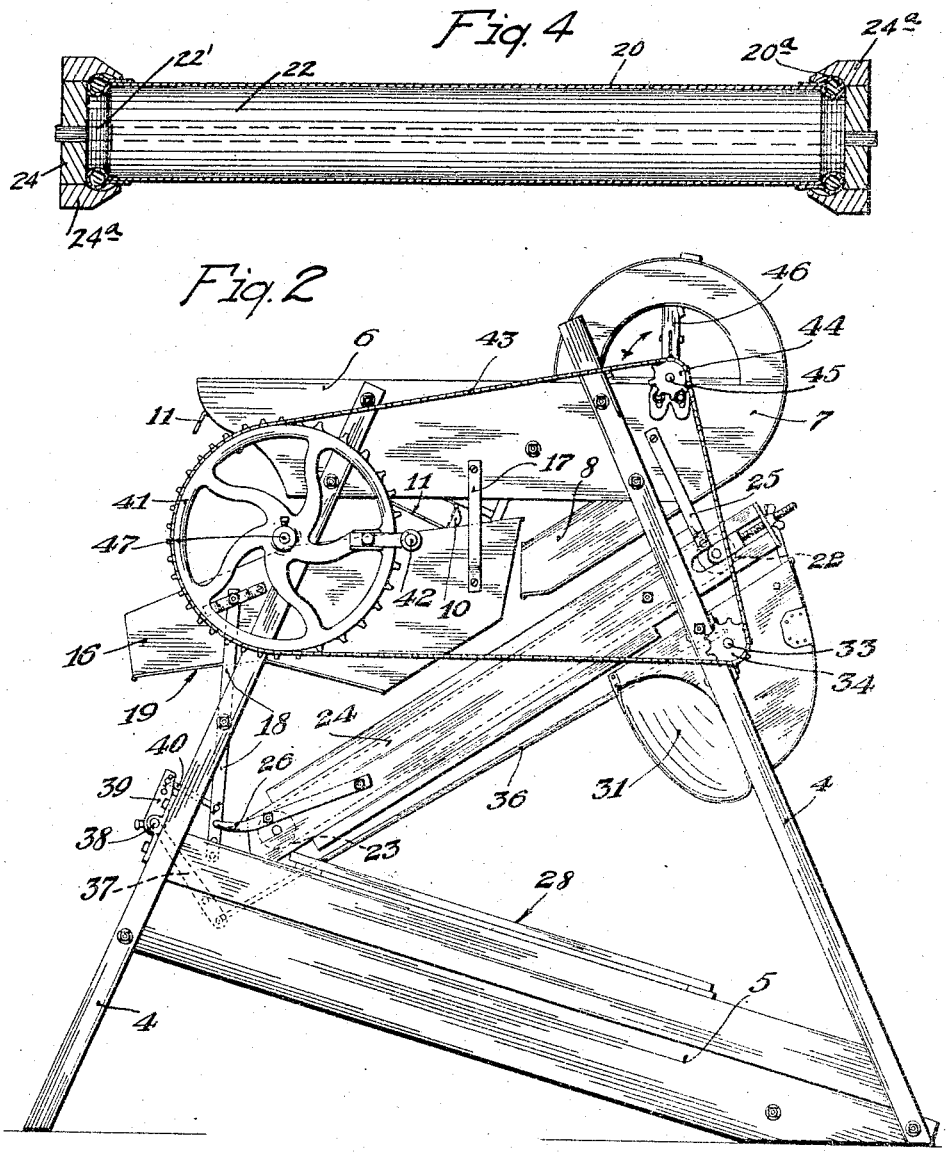

W. H. BOT.
SEPARATOR.
APPLICATION FILED APR. 26, 1917.
1,287,624.
Patented Dec. 17, 1918.
3 SHEETS—SHEET 3.
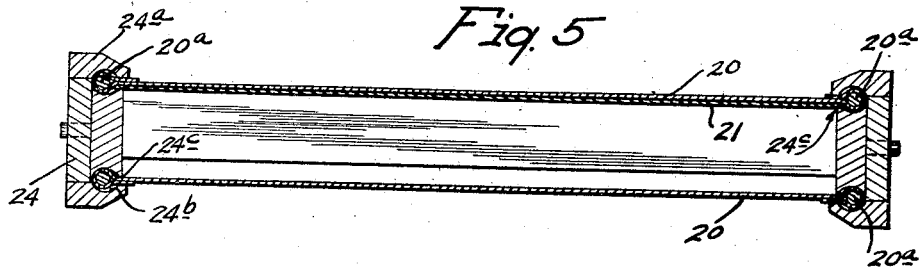
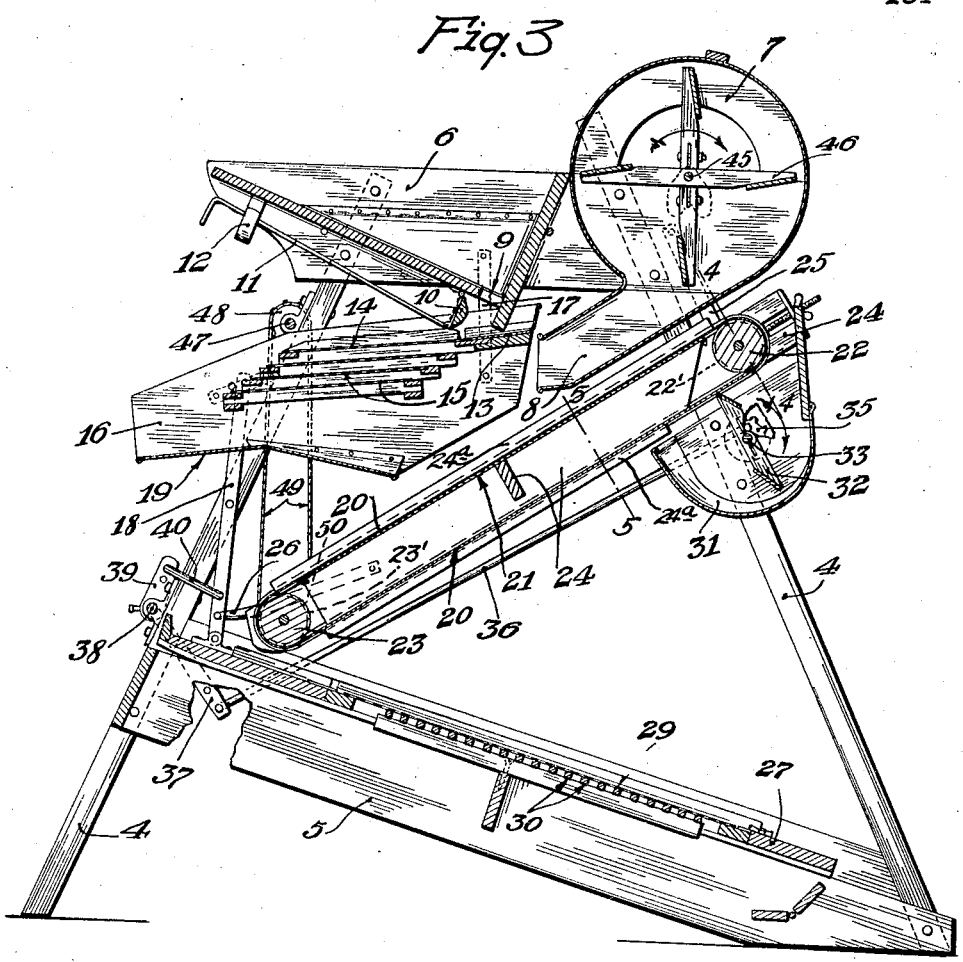
Witnesses
Geo Knutson
E. C. Wells
Inventor
WILLIAM H. BOT
By his Attorneys

UNITED STATES PATENT OFFICE.

WILLIAM H. BOT, OF GHENT, MINNESOTA, ASSIGNOR TO GHENT MANUFACTURING COMPANY, OF GHENT, MINNESOTA, A CORPORATION OF MINNESOTA.

SEPARATOR.

1,287,624.  Specification of Letters Patent.  Patented Dec. 17, 1918.

Application filed April 26, 1917. Serial No. 164,647.

*To all whom it may concern:*

Be it known that I, WILLIAM H. BOT, a citizen of the United States, residing at Ghent, in the county of Lyon and State of Minnesota, have invented certain new and useful Improvements in Separators; and I do hereby declare the following to be a full, clear, and exact description of the invention, such as will enable others skilled in the art to which it appertains to make and use the same.

My invention has for its object to provide an improved grain separator of the type generally known as fanning mills, and which is especially adapted for the separation of succotash. So-called succotash is a mixture of wheat, tame oats, and usually more or less of various other foreign seeds and materials, such as wild oats, cockle, mustard seed, chaff, dust, etc.

This improved fanning mill will not only take the tame oats, wild oats, cockle, chaff, dust, etc., out of good wheat, but will separate the tame oats and wild oats from each other and remove other foreign materials from both thereof.

A machine embodying the several features of my invention is illustrated in the accompanying drawings wherein like characters indicate like parts throughout the several views.

Referring to the drawings:

Fig. 2 is a side elevation of the same;

Fig. 3 is a vertical section taken approximately on the line 3—3 of Fig. 1;

Fig. 4 is a detail view in section taken on the line 4—4 of Fig. 3, on an enlarged scale; and Fig. 5 is a detail view in section taken on the line 5—5 of Fig. 3, on an enlarged scale.

Figure 1:
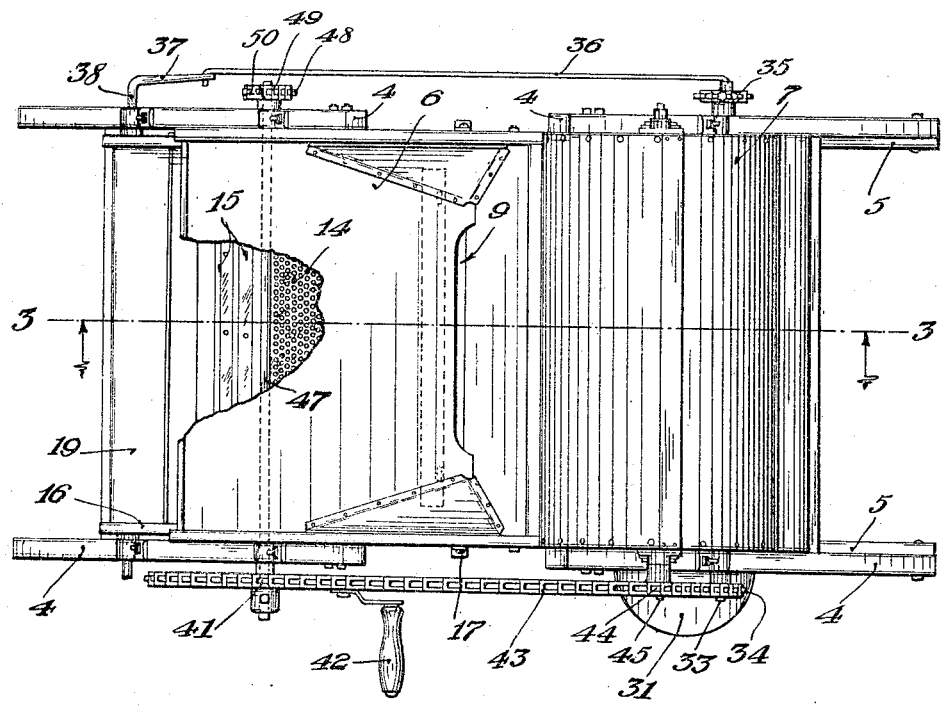
Figure 1 is a plan view of the improved fanning mill with some parts broken away.

A suitable framework, as shown, comprising oblique legs 4 and lower side boards 5, at its uppermost portion supports the feed hopper 6, and which hopper serves to brace and tie together the upper ends of the said legs. The sides of the hopper are extended and support a fan casing 7 which has an oblique downwardly extended discharge spout 8. In the bottom of the hopper 6 is a discharge opening 9 adapted to be closed or opened, more or less, by a gate or valve 10 shown as hinged to the bottom of the hopper and arranged to be operated by a rod 11, the free end of which is frictionally held in various adjustments by the fork spring jaw of a bracket 12, also shown as applied to the bottom of the hopper. The hopper discharge passage 9 delivers onto the imperforate upper end deck portion 13 of a scalping screen 14. This scalping screen 14 is one of a gang of screens, all of which are preferably perforate zinc screens, the lower members being indicated by the numeral 15 and all being carried by a vibratory shoe 16. This shoe 16 is arranged to vibrate longitudinally of the machine and its rear or inner end portion is suspended by a pair of links 17 pivotally connected thereto and to the sides of the hopper. The front or outer end portion of said shoe is pivoted to the upper ends of a pair of laterally spaced levers 18 that are intermediately pivoted to the front legs 4. The shoe 16 has an imperforate bottom deck 19 that inclines in reverse directions from its intermediate portion, so that the front portion delivers forwardly or outwardly and the inner portion thereof, delivers backwardly or inwardly and onto an endless apron 20. This apron 20 has a fuzzy surface so that it will catch and carry upward, wild oats in particular, but also certain other objects. Preferably, the said apron is made of cotton flannel and it is arranged to run over an inclined deck 21, and upper and lower rollers 22 and 23. The deck 21, which as shown, is of sheet metal, is a rigid part of a supplemental frame 24 and the said rollers 22 and 23 are journaled therein. This supplemental frame 24, at its upper end, is hinged on laterally spaced links 25 pivoted thereto and to the extended sides of the hopper, and at its lower end, has laterally spaced rigid arms 26 that are pivotally connected to the lower portions of the laterally spaced levers 18. The said supplemental frame is thus mounted for oscillatory movements longitudinally of the machine.

The side members of the supplemental frame 24 have at their upper and lower edges removable sections 24ª held in position by screws or other suitable means. Formed partly in each side member of the supplemental frame 24 and partly in the removable sections thereof, are upper and lower guide channels 24$^b$ having contracted entrance passageways 24$^c$. The body portion of the guide channels 24$^b$ are round in cross section substantially the full distance between the rollers 22 and 23. Formed in the rollers 22 and 23 are circumferential grooves 22′ and 23′, respectively, with the bottoms of which the bottoms of the upper guide channels 24$^b$ and the tops of the lower guide channels extend tangentially. The edges of the endless separating apron 20 are hemmed and a filler, in the form of a rope or other suitable material, placed therein to form beads 20$^a$. The edge portions of the apron 20 travel in the contracted entrance passageways 24$^c$ of the guide channels 24$^b$, and the beads 20$^a$ travel in said guide channels and in the grooves 22′ and 23′. As the beads 20$^a$ of the apron 20 are held in the guide channels 24$^b$ by the contracted passageways 24$^c$ thereof, they, in turn, hold said apron stretched smooth upon the deck 21 and prevent the same from drifting toward either side of the supplemental frame 24.

Located below the supplemental frame 24 is an oblique lower shoe 27 that is mounted to slide in suitable guides on the oblique side bars 5 of the machine frame. The hopper or front end portion of this shoe 27 is pivotally connected to the lower ends of the levers 18 so that it will be reciprocated thereby. Said shoe 27 carries a screen 29 arranged to be cleaned by the transverse slats of a cleaning rack 30 that is rigidly secured to the said side bars 5 and over which said screen 29 is arranged to slide.

Located just below the upper end of the endless apron 20 is a transversely inclined spout 31 that also affords a sort of a casing for a rotary scraper 32, the shaft of which is journaled in suitable bearings on the sides of the machine frame, and the shaft 33 of which projects at one end and is provided with a sprocket 34. The outer edges of the blades of the rotary scraper 32 are arranged to slightly engage with the under surface of the apron 20, for a purpose which will presently appear. The opposite end of the shaft 33 is provided with a crank head or disk 35 that is connected by a rod 36 to the depending arm 37 of a rock shaft 38 mounted in suitable bearings on the front legs 4. This shaft 38 has upwardly extended arms 9 that are connected by short links or rods 40 to the lower portions of two levers 18. Suitably journaled to one side of the machine frame, as shown, to one of the legs 4, is a relatively large driving sprocket 41 shown as provided with a crank 42 by means of which it may be driven by hand power. A sprocket chain 43 runs over the sprocket 41 under the sprocket 34 of the rotary scraper, and over a small sprocket 44 on the end of a fan shaft 45 that is journaled in suitable bearings on the extended sides of the hopper 6 and carries a fan head 46 that works within the fan casing 7.

The driving sprocket 41, as shown, is connected to one end of a transverse shaft 47, which, at its other end, is provided with a small sprocket 48. A sprocket chain 49 runs over the sprocket 48 and over a sprocket 50 on the projecting end of the shaft of the lower roller 23. The amount of endwise vibratory movement given to the supplemental frame 24 is so slight, and the lower end thereof travels on such arc that such vibratory movement does not materially change the tension of the chain 49.

Operation: The machine shown is a hand-operated machine, but, of course, it might be driven by power. With the connections described, it is evident that under rotation of the crank-equipped driving sprocket 41, the fan head 46 and the rotary scraper 32 will be rotated, and the sieve shoes 16 and 27 and the supplemental frame 24 will be vibrated, and moreover, the apron 20 will be driven in such direction that its inclined upper portion will travel upwardly over the inclined deck 21.

The succotash or mixed grains are, of course, introduced into the hopper 6, and from thence, will be fed onto the scalping screen 14, at a rate depending on the adjustment of the gate or valve 10. By this scalping screen shaft the coarse materials will be carried off but the main body thereof will pass through said scalping screen. The stock will pass through the scalping screen 14, and by the action of the screens 15, most of the tame oats and some of the wild oats will be carried off, and by the outwardly inclined portion of the deck 19, will be delivered onto the upwardly moving portion of the separating apron 21. Under the vibratory movement imparted to the frame 24, the wheat which is relatively smooth and round, will roll downward and will be delivered to the lower screen 29 of the vibratory shoe 27, while the wild oats and tame oats, if any, will be carried upward by the fuzzy surface of the separating apron and will be delivered into the transverse spout 31.

By beading the edges of the apron 20 and causing the same to travel in guide channels 24$^b$, it is possible to keep the apron smooth and free from wrinkles, creases, or pockets in which the good grain might lodge and be carried upward and over the separating apron 20. As previously stated, these beaded edges of the apron keep the same from drifting toward either side of the machine.

The scraping action of the blades of the rotary scraper 32 will insure the removal of the wild oats from the separating apron, and falling into the spout 31, will be delivered therefrom by gravity. Any small seeds or small heavy materials which may have passed with the good wheat onto the screen 29, will pass therethrough, while the clean wheat will be delivered from the lower end of the said screen.

What I claim is:

1. In a machine of the kind described, the combination with a hopper and a frame supporting the same, of a sieve-equipped shoe receiving from said hopper, links supporting the inner end of said shoe from said frame, laterally spaced levers intermediately pivoted to said frame with their upper ends pivotally connected to and supporting the outer portion of said shoe, an inclined supplemental frame equipped with rollers, an endless separating apron running over said rollers, links supporting the upper end of said supplemental frame, said supplemental frame, at its lower end, having projected arms pivotally connected to the lower ends of said laterally spaced levers, a rock shaft having connections to said laterally spaced levers for simultaneously vibrating the same, and connections for driving the apron and for oscillating the rock shaft.

2. In a machine of the kind described, the combination with a hopper and a frame supporting the same, of a sieve-equipped shoe receiving from said hopper, links supporting the inner end of said shoe from said frame, laterally spaced levers intermediately pivoted to said frame with their upper ends pivotally connected to and supporting the outer portion of said shoe, an inclined supplemental frame equipped with rollers, an endless separating apron running over said rollers, links supporting the upper end of said supplemental frame, said supplemental frame, at its lower end, having projected arms pivotally connected to the lower ends of said laterally spaced levers, a lower sieve-equipped shoe mounted to vibrate and connected to the lower ends of said levers, a rock shaft having connections to said laterally spaced levers for simultaneously vibrating the same, and connections for driving the apron and for oscillating the rock shaft.

3. In a machine of the kind described, the combination with a hopper and a frame supporting the same, of a sieve-equipped shoe receiving from said hopper, links supporting the inner end of said shoe from said frame, laterally spaced levers intermediately pivoted to said frame with their upper ends pivotally connected to and supporting the outer portion of said shoe, an inclined supplemental frame equipped with rollers, an endless separating apron running over said rollers, links supporting the upper end of said supplemental frame, said supplemental frame, at its lower end, having projected arms pivotally connected to the lower ends of said laterally spaced levers, a lower sieve-equipped shoe mounted to vibrate and connected to the lower ends of said levers, a rock shaft having connections to said laterally spaced levers for simultaneously vibrating the same, a spout below the upper portion of said separating apron, a rotary scraper working in said spout and operating on the undersurface of said separating apron, connections for driving said apron and scraper, and connections for oscillating the rock shaft from the scraper.

In testimony whereof I affix my signature in presence of two witnesses.

WILLIAM H. BOT.

Witnesses:
 EDWARD A. DIERICKS,
 JOHN H. BOT.

Copies of this patent may be obtained for five cents each, by addressing the "Commissioner of Patents, Washington, D. C."